United States Patent
Ninomiya et al.

(10) Patent No.: US 6,888,687 B2
(45) Date of Patent: May 3, 2005

(54) PHOTOGRAPHIC LENS AND CAMERA MODULE

(75) Inventors: Noboru Ninomiya, Ome (JP); Naohisa Yamaguchi, Nagano-ken (JP); Eiki Matsuo, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/420,537

(22) Filed: Apr. 21, 2003

(65) Prior Publication Data

US 2004/0012703 A1 Jan. 22, 2004

(30) Foreign Application Priority Data

May 10, 2002  (JP) ........................................ 2002-136253

(51) Int. Cl.[7] .......................... G02B 3/02; G02B 13/18; H04N 5/225
(52) U.S. Cl. ...................................... 359/718; 348/335
(58) Field of Search .......................... 359/718, 708–711, 359/682, 690, 692, 794–796; 348/335, 340

(56) References Cited

U.S. PATENT DOCUMENTS 6,297,915 B1 * 10/2001 Kaneko et al. ............. 359/718
6,507,443 B2 *  1/2003 Kitagawa ................... 359/718

FOREIGN PATENT DOCUMENTS

| JP | 06-088939 | 3/1994 |
|---|---|---|
| JP | 06-118300 | 4/1994 |
| JP | 09-230233 | 9/1997 |
| JP | 11-183794 | 7/1999 |
| JP | 11-249014 | 9/1999 |
| JP | 2000-249911 | 9/2000 |
| JP | 2000-266998 | 9/2000 |
| JP | 2000-321491 | 11/2000 |
| JP | 2000-321492 | 11/2000 |
| JP | 2001-221904 | 8/2001 |

OTHER PUBLICATIONS

Communication from Japanese Patent Office re: counterpart application. (No translation).

* cited by examiner

*Primary Examiner*—Georgia Epps
*Assistant Examiner*—Alicia M. Harrington
(74) *Attorney, Agent, or Firm*—Harness, Dickey & Pierce, P.L.C.

(57) ABSTRACT

For a positive lens having a convex surface on an image side thereof and a diaphragm provided on an object side thereof, the following conditions are satisfied when a surface of the lens at least on the image side is aspheric, a focal length is f, a distance from the diaphragm to a front surface of the lens is D0, and a thickness of the lens is D1: $0.2 < D0/f < 0.8$, $1.2 < (D0+D1)/f$, and $0.4 < R2/f < 1.0$.

7 Claims, 9 Drawing Sheets

Diaphragm

PHOTOGRAPHIC LENS AND CAMERA MODULE

BACKGROUND OF THE INVENTION

TECHNICAL FIELD OF THE INVENTION

The present invention relates to a photographing lens that focuses an image of a subject on an image receiving surface.

CONVENTIONAL TECHNOLOGY

In recent years, photographing camera modules have come to be mounted on portable terminals including cellular phones. In these types of equipment, it is indispensable to reduce the size of camera modules in order to improve their portability. Meanwhile, it has become possible that photographing elements such as CCD and CMOS can be made into a size with each pixel being approximately several μm, such that photographing elements not only having a high resolution but being small in size can be realized. There are greater demands in photographing optical systems that are to be combined with photographing elements towards further miniaturization and lower costs, and optical systems that satisfy all the contradicting conditions such as miniaturization, lower costs, high resolution and excellent optical performances are demanded.

Some of the specific requirement items demanded in such optical systems are generally as follows:

Low costs (the number of elements should be as low as possible, they can be composed of resin, can be readily assembled, and so forth)

Brightness (small Fno)

Small size (in particular, short length from a lens end to a photographing element)

Large viewing angle (preferably 30° or greater)

Uniform luminance of field (few eclipse/smaller angle of incidence on a photographing element)

High resolution (fundamental aberrations such as spherical aberration, coma, curvature of field, astigmatism, distortion, chromatic aberration and the like are to be well corrected)

If an optical system that satisfies all of such conditions is to be realized with a single lens, such system will prove to be a great advantage. To satisfy the conditions described above, many single-component lenses have been proposed.

In general, a single lens absolutely lacks the parameters to balance the overall aberrations including chromatic aberration. For example, Japanese laid-open patent application HEI 06-088939 describes a bi-convex lens composition shown in FIG. 15, which is bright and has a great viewing angle. However, a diaphragm is disposed in close proximity to a first surface of the lens in order to balance the aberrations and to reduce the occurrence of chromatic aberration as much as possible. By placing the diaphragm in close proximity to the first surface, an aspheric surface of the second surface that would be effective in correcting off-axis aberrations (i.e., distortion, astigmatism, curvature of field and the like) cannot be effectively utilized, and some of the off-axis aberrations fall short of correction. In the case of this example, its distortion becomes relatively large. Also, it provides a relatively large angle of incidence on a photographing element, which is about 20°. Japanese laid-open patent application 2000-249911 and Japanese laid-open patent application 2000-266998 can be listed as describing examples of other compositions that are essentially based on the same idea as the above.

All of the aforementioned examples relate to a front diaphragm type in which a diaphragm is disposed on the front side of the lens. The front diaphragm type is advantageous over a middle diaphragm type or a rear diaphragm type because it can reduce an angle of incidence with respect to a sensor. In particular, the Japanese laid-open patent application 2000-266998 pays much attention to reducing an angle of incidence on a sensor as much as possible. However, it can only achieve a relatively large incident angle of about 15° with respect to a sensor at its maximum viewing angle. The angle of incidence to a photographing element is a very important factor in reducing eclipse of luminous flux due to the structure of photographing element and in maintaining brightness and contrast in marginal areas of a picture.

The reason for not being able to make the angle of incidence on a sensor small enough even in the front diaphragm type is that, although the angle of incidence on the sensor may be made small by separating the iris toward the front side, this makes it difficult to balance the overall aberrations, and in particular, this causes a large chromatic aberration. In the case of a single lens component, there are fundamentally few parameters, and how additional parameters, such as, the shape of each surface (concave surface, convex surface), thickness, glass material, position of diaphragm, and aspheric surface are to be set becomes problematic. Even though they are optimally set, it is difficult to satisfy all of the conditions listed above. Therefore, it would become indispensable to relax some of the conditions depending on specific purposes to achieve a balance in terms of optical performances.

Japanese laid-open patent application 2000-321491, Japanese laid-open patent application 2000-321492 and Japanese laid-open patent application 2000-221904 can be listed as describing other front diaphragm type compositions with a meniscus lens component that has a concave surface on the object side and a convex surface on the image side. These examples also entail substantially the same problems as described above.

Meanwhile, there have been attempts to achieve the overall balance by adding further degrees of freedom. Japanese laid-open patent application HEI 11-183794 intends to reduce the angle of incidence on a sensor by introducing a surface having a diffraction effect to thereby independently correct the magnification chromatic aberration, which may otherwise be difficult to achieve solely by its refraction surface. Such an attempt may be effective in one aspect, but on the other hand it has negative aspects such as diffusion by the diffraction surface, over sensitiveness to changes in the environment and so fourth.

Therefore, it would be desirable to provide a small and inexpensive lens system that covers a half viewing angle of 30° or greater and reduces the angle of incidence with respect to a photographing element to thereby secure a sufficient brightness in the marginal area, and that corrects axial aberrations and off-axis aberrations well.

SUMMARY

To achieve the object described above, the present invention can be structured as follows. First, in accordance with a first aspect, a photographing lens, which includes a positive lens having a convex surface on an image side thereof and a diaphragm provided on an object side thereof, is characterized in satisfying a set of conditions as described below when a surface of the lens at least on the image side is aspheric, a focal length is f, a distance from the diaphragm to a front surface of the lens is D0, and a thickness of the lens is D1:

$$0.2 < D0/f < 0.8$$

$$1.2 < (D0+D1)/f$$

$$0.4 < R2/f < 1.0$$

In accordance with a second aspect, a photographing lens of the present invention, which includes a positive lens having bi-convex surfaces and a diaphragm provided on an object side thereof, is characterized in satisfying a set of conditions as described below when a surface of the lens at least on an image side is aspheric, a focal length is f, a distance from the diaphragm to a front surface of the lens is D0, a thickness of the lens is D1, a radius of curvature of the lens on the object side is R1, and a radius of curvature of the lens on the image side is R2:

$$0.2 < D0/f < 0.8$$

$$1.2 < (D0+D1)/f$$

$$1.0 < R1/R2 < 2.5$$

In accordance with a third aspect, in a camera module having a sensor module disposed on the image side of the photographing lens of the present invention, the sensor module has a processing function to correct a chromatic aberration.

By the structures described above, a half viewing angle of 30° or greater can be covered, axial aberrations and off-axis aberrations can be well corrected, and the angle of incidence on a photographing element can be made smaller. As a result, a sufficient brightness can be secured even in marginal areas, and a small and inexpensive lens system can be provided.

DETAILED DESCRIPTION

Next, embodiments of the present invention are described based on specific composition examples.

Figure 1:
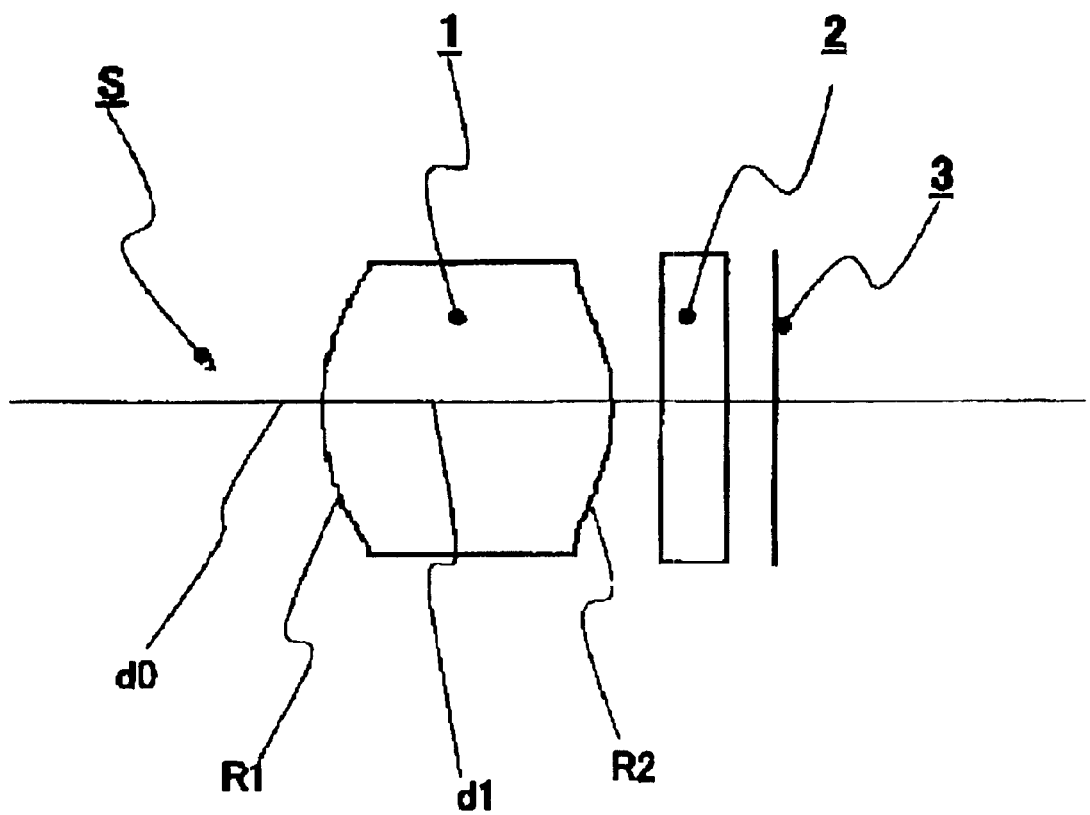
FIG. 1 shows a cross-sectional view of an optical system of Embodiment Example 1.
Figure 2:
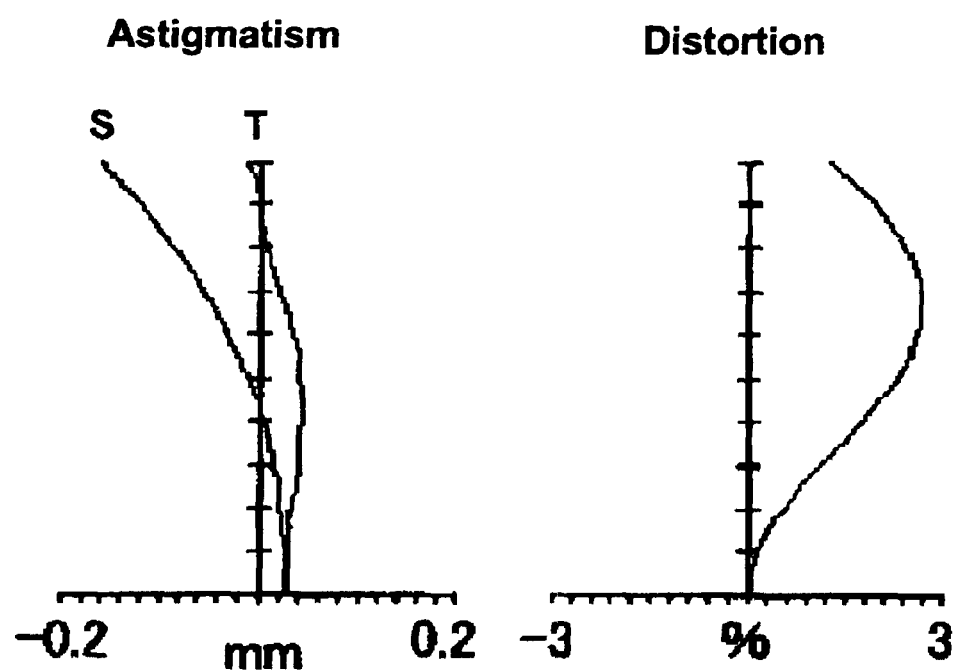
FIG. 2 shows off-axis aberration diagrams of Embodiment Example 1.
Figure 3:
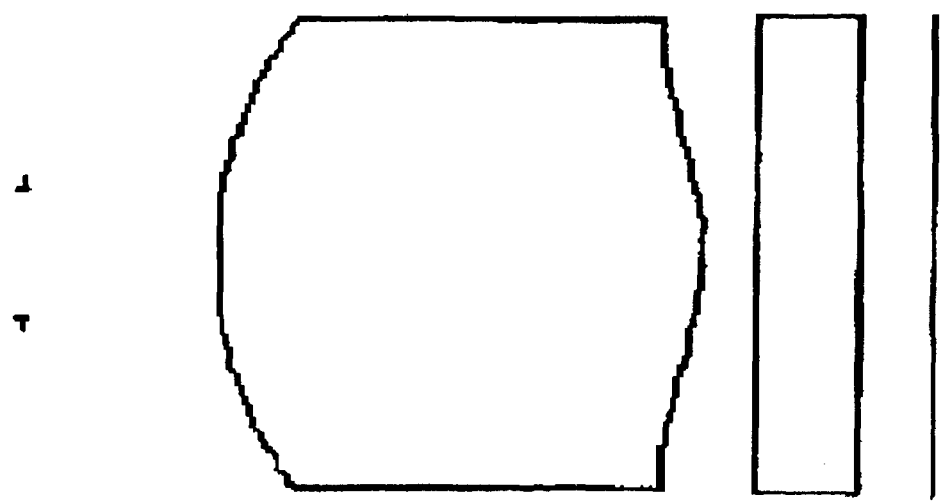
FIG. 3 shows a cross-sectional view of an optical system of Embodiment Example 2.
Figure 4:
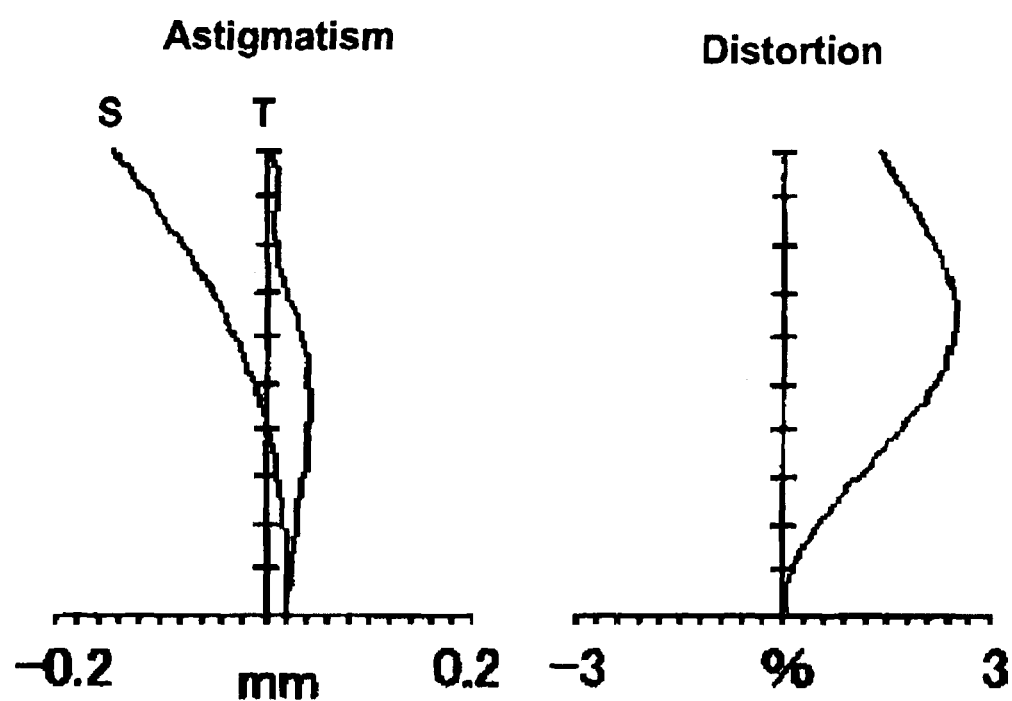
FIG. 4 shows off-axis aberration diagrams of Embodiment Example 2.
Figure 5:
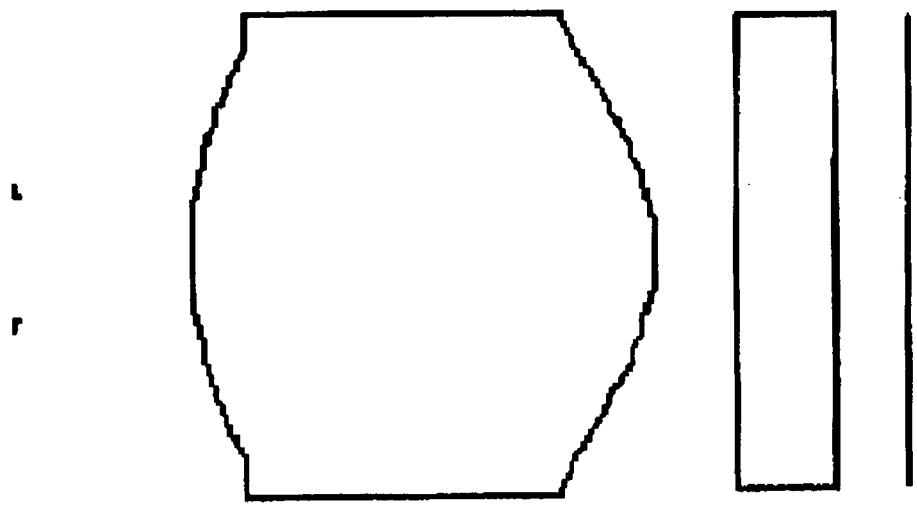
FIG. 5 shows a cross-sectional view of an optical system of Embodiment Example 3.
Figure 6:
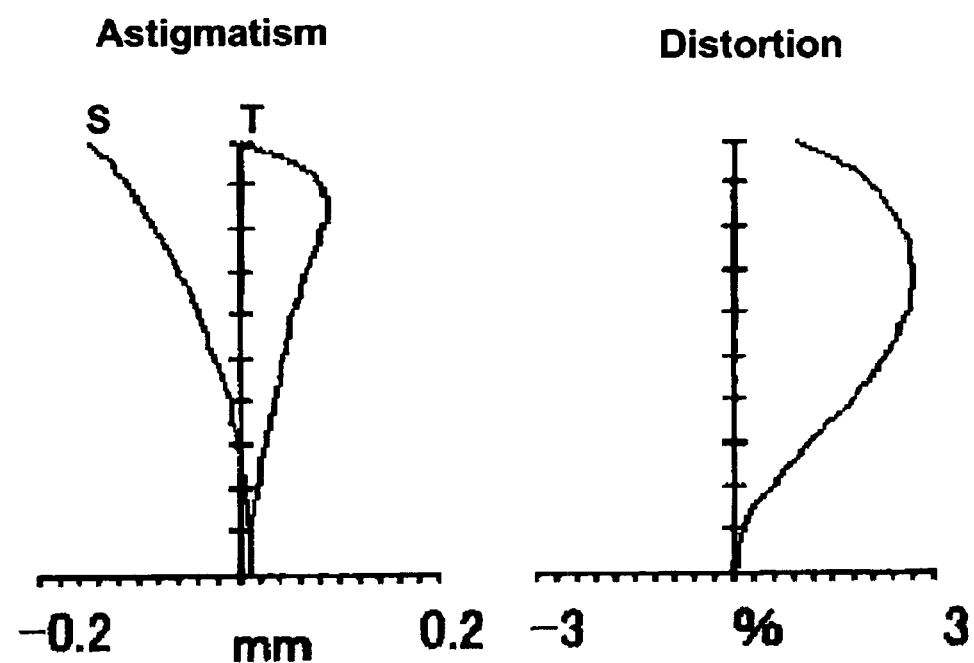
FIG. 6 shows off-axis aberration diagrams of Embodiment Example 3.
Figure 7:
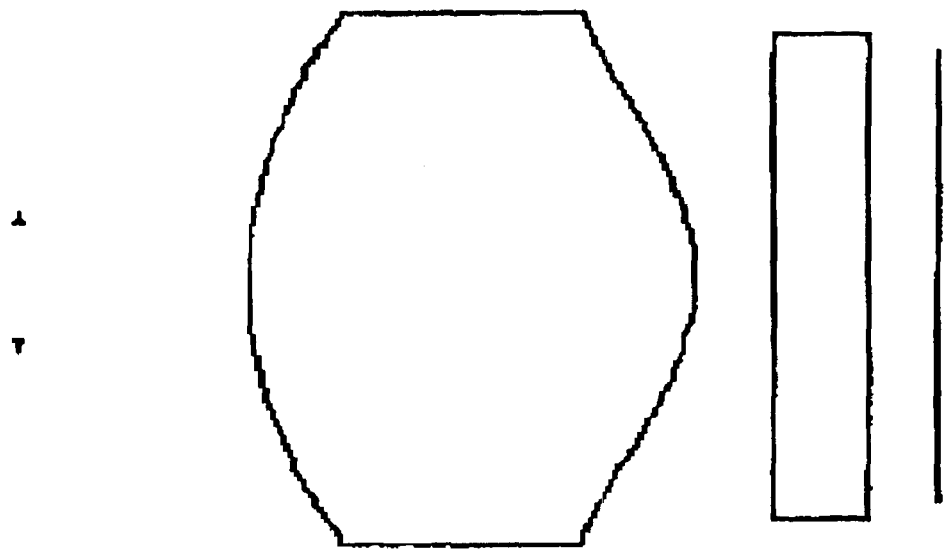
FIG. 7 shows a cross-sectional view of an optical system of Embodiment Example 4.
Figure 8:
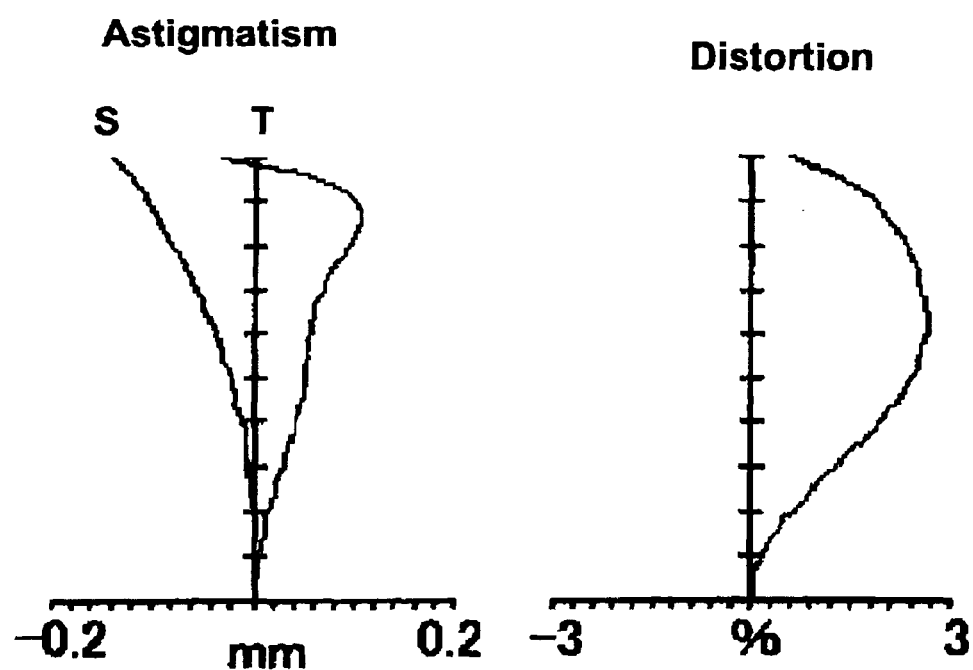
FIG. 8 shows off-axis aberration diagrams of Embodiment Example. 4.
Figure 9:
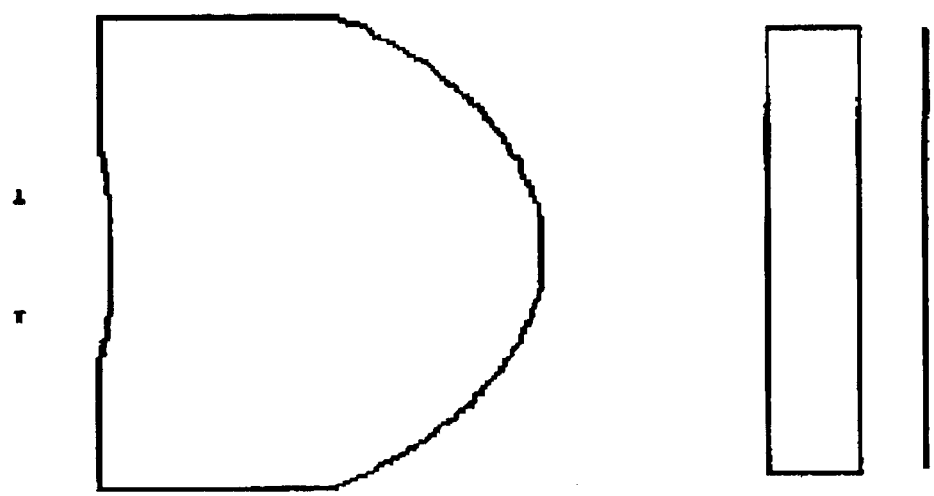
FIG. 9 shows a cross-sectional view of an optical system of Embodiment Example 5.
Figure 10:
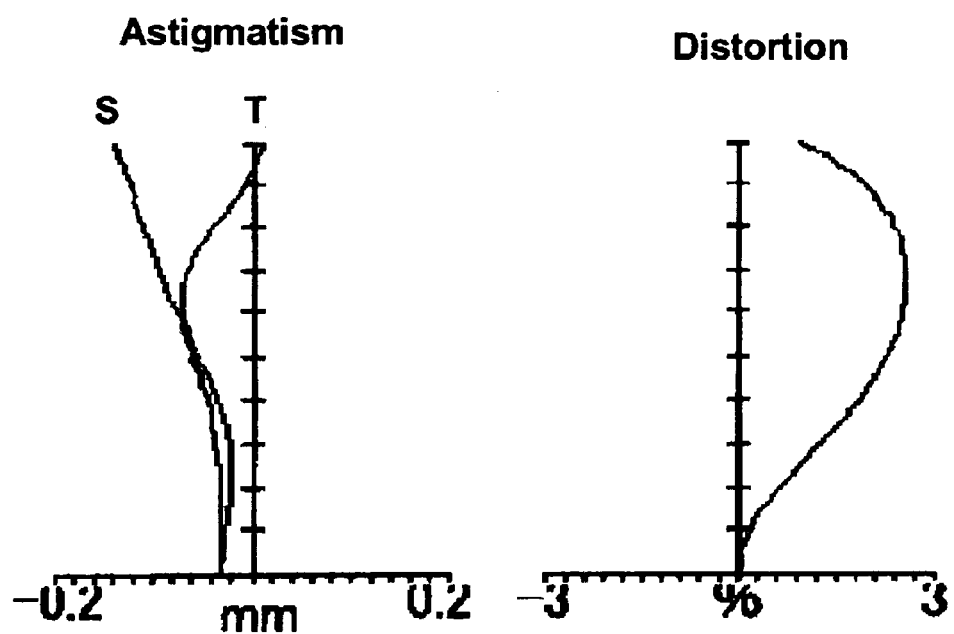
FIG. 10 shows off-axis aberration diagrams of Embodiment Example 5.
Figure 11:
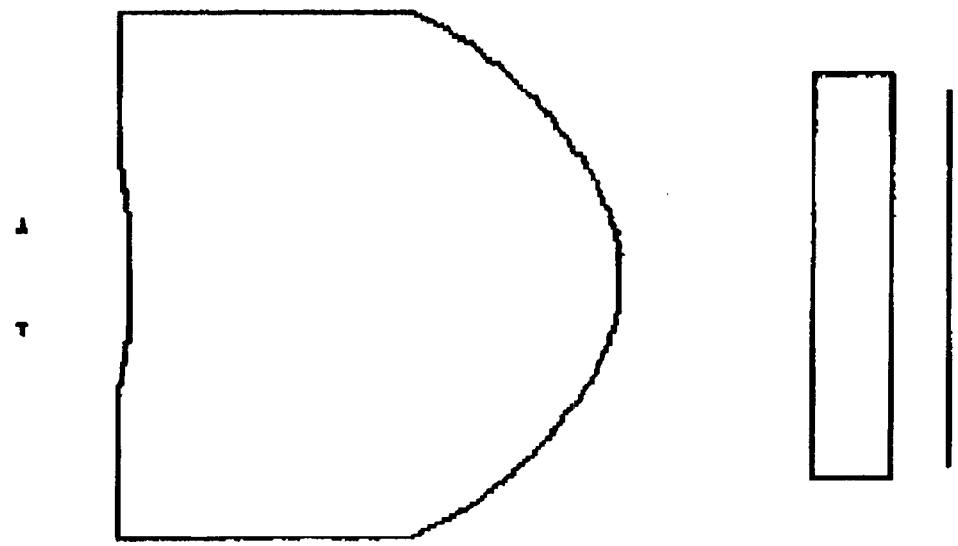
FIG. 11 shows a cross-sectional view of an optical system of Embodiment Example 6.
Figure 12:
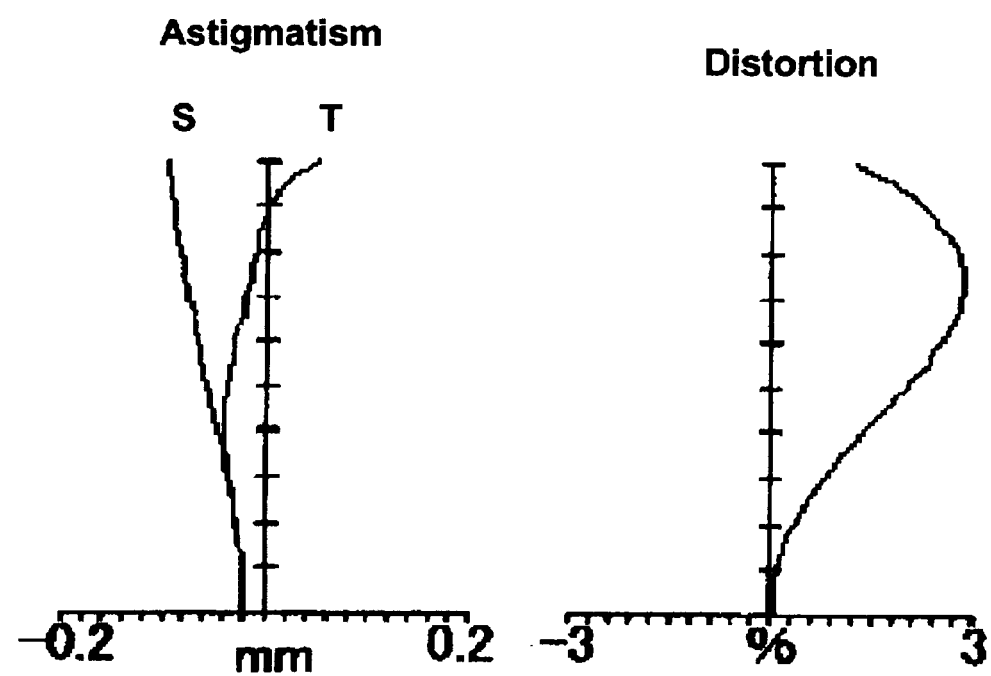
FIG. 12 shows off-axis aberration diagrams of Embodiment Example 6.
Figure 13:
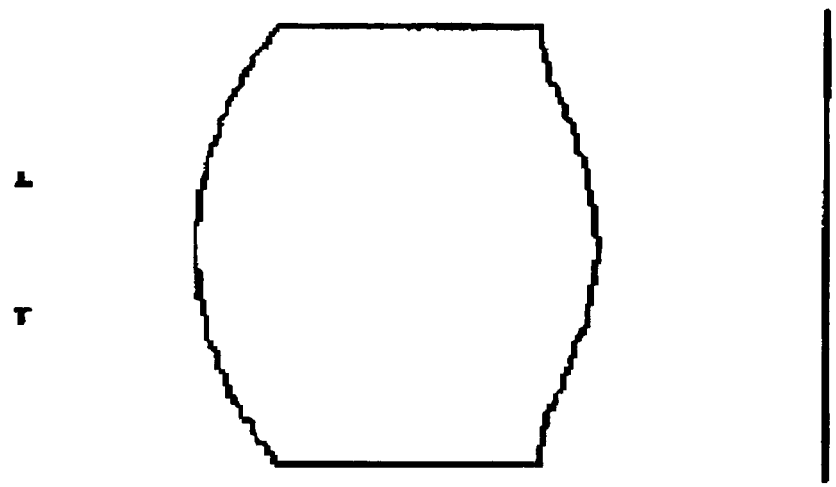
FIG. 13 shows a cross-sectional view of an optical system of Embodiment Example 7.
Figure 14:
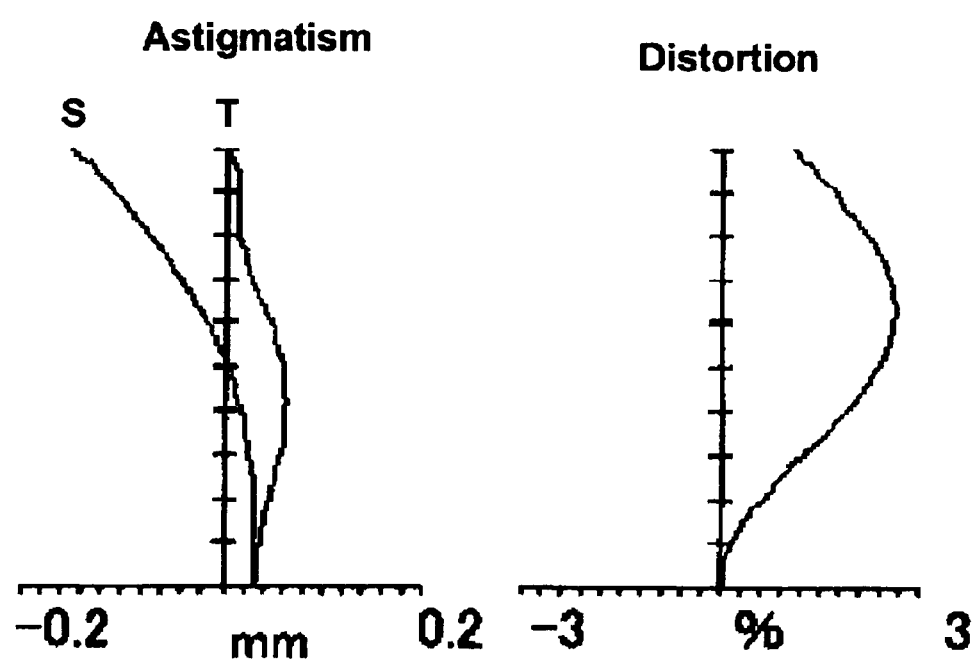
FIG. 14 shows off-axis aberration diagrams of Embodiment Example 7.
Figure 15:
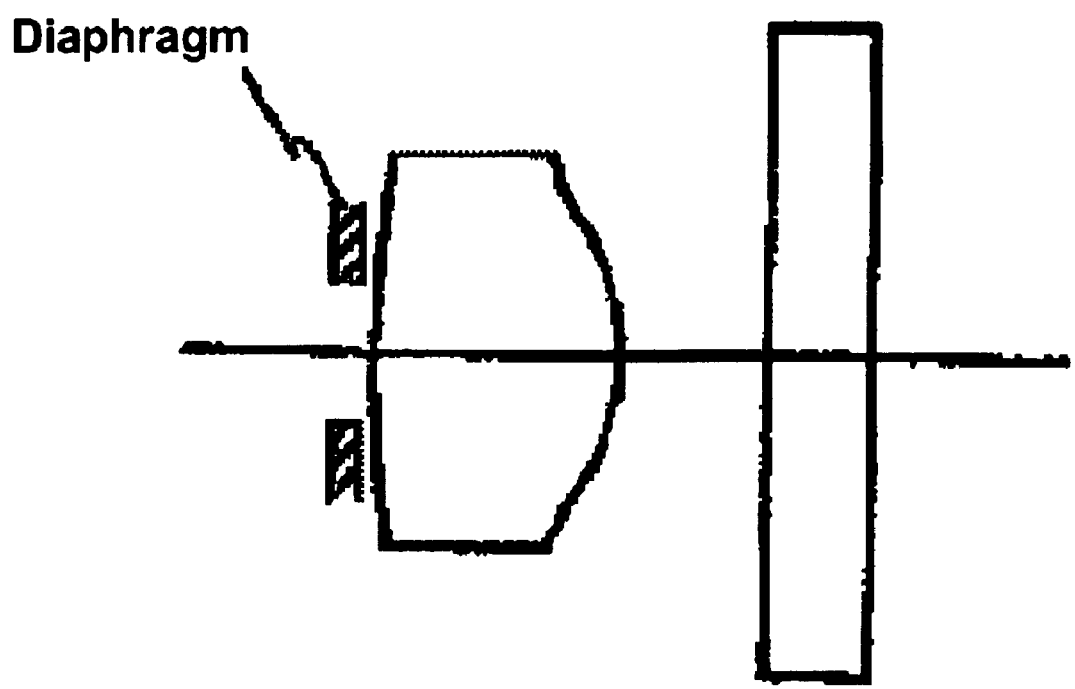
FIG. 15 shows a cross-sectional view of an optical system of Japanese laid-open patent application HEI 6-088939.

FIG. 1 shows a cross-sectional view of a photographing lens in accordance with an embodiment of the present invention. A luminous flux that enters from an object side successively passes an aperture diaphragm S provided on the object side, a photographing lens 1, and a cover glass 2, and then converges on a light receiving surface of a photographing element 3. The photographing lens 1 is a bi-convex resin lens with both of its surfaces being aspherical, a focal distance being 2.1 mm, and Fno being 2.9, which covers a half viewing angle of 32.1°. In such a single lens, the position of the diaphragm S is one of the most important parameters, which greatly changes optimum ranges of other parameters including the shape depending on where it is disposed.

In the present invention, the diaphragm S is placed on the front side of the photographing lens 1, and a separation D0 between the aperture diaphragm S and the photographing lens 1 is set as follows:

$$0.2 < D0/f < 0.8$$

where f is a paraxial focal distance. The lower value sets a limit that keeps the angle of luminous flux incident upon the photographing element 3 small; and if it is lower than this limit, the angle of incidence becomes large, and the light amount in the marginal area lowers. If the value exceeds the upper limit, the lens has a large diameter, and the lens needs to be made thicker to secure its end thickness, which poses a disadvantage in miniaturization.

Also, the sum of the separation D0 between the diaphragm S and the photographing lens 1 and the thickness D1 of the photographing lens 1 satisfies the following condition:

$$1.2 < (D0+D1)/f$$

This is a condition for maintaining a predetermined distance or greater between the diaphragm S and the surface R2 on the image side, reduces the angle of incidence with respect to the photographing element 3, increases the off-axis luminous flux height at the surface R2 on the image side, and effectively corrects the off-axis aberration with the aspherical surface provided on the surface 2R.

In addition to the conditions described above, the following condition may be further satisfied to compose the target photographing lens:

$$0.4 < R2/f < 1.0$$

When the value is lower than the lower limit, the power of the surface R2 becomes too strong such that the off-axis aberrations cannot be balanced. When the value exceeds the upper limit, the power of the surface R2 becomes weak such that the angle of incidence on the photographing element 3 becomes large.

The surface R1 on the object side of the photographing lens 1 can either be a concave surface or a convex surface. However, in the case of a convex surface, the following condition with respect to the surface R1 on the object side and the surface R2 on the image side may be replaced with the above condition, to compose the target photographing lens:

$$1 < R1/R2 < 2.5$$

If the upper limit is exceeded, the power of the surface R2 becomes too strong, such that the off-axis aberrations cannot be balanced. When the value is lower than the upper limit, the power of the surface R2 becomes weak such that the angle of incidence on the photographing element 3 becomes large.

By the structures described above, the off-axis aberrations are corrected well, and a single lens with a small angle of incidence with respect to the photographing element 3 can be composed. However, as the diaphragm S is removed away from the lens 1, the chromatic aberration in magnification increases. This becomes more noticeable as the viewing angle increases. In accordance with the present invention, such a chromatic aberration is corrected by adding a function for processing chromatic aberrations to a sensor module that includes the photographing element 3. The chromatic aberration of a single lens that is off-axially generated is separated by the prism function of the lens such that blue light is deflected toward the optical axis and red light toward the outside with green light being a reference. It can be understood that the magnification of the optical system shifts depending on each of the colors. The shifting amount in each of the colors can be predicted based on the design values and corrected.

By combining the above lens structure and the chromatic correction function, there can be provided a single lens that is capable of correcting the off-axis aberrations and chromatic aberration at the same time. It goes without saying that the chromatic correction part can be omitted when it is not needed.

EXAMPLES

Next, embodiment examples of the present invention are presented with examples of specific numerical values.

TABLE 1

| Lens composition parameters | | | | | | | | |
|---|---|---|---|---|---|---|---|---|
| | Radius of curvature | | Separation | | Refractive Index | | Dispersion | |
| Embodiment Example 1 | | | d0 | 0.910 | | | | |
| 1 | R1 | 1.873 | d1 | 2.380 | n1 | 1.506 | υ1 | 51.0 |
| 2 | R2 | −1.365 | d2 | 0.400 | n2 | 1.000 | υ2 | |
| 3 | R3 | | d3 | 0.550 | n3 | 1.522 | υ3 | 59.5 |
| 4 | R4 | | d4 | 0.400 | n4 | 1.000 | υ4 | |
| Embodiment Example 2 | | | d0 | 1.050 | | | | |
| 1 | R1 | 2.070 | d1 | 2.600 | n1 | 1.620 | υ1 | 60.3 |
| 2 | R2 | −1.760 | d2 | 0.295 | n2 | 1.000 | υ2 | |
| 3 | R3 | | d3 | 0.550 | n3 | 1.522 | υ3 | 59.5 |
| 4 | R4 | | d4 | 0.400 | n4 | 1.000 | υ4 | |
| Embodiment Example 3 | | | d0 | 0.976 | | | | |
| 1 | R1 | 2.143 | d1 | 2.600 | n1 | 1.506 | υ1 | 51.0 |
| 2 | R2 | −1.218 | d2 | 0.460 | n2 | 1.000 | υ2 | |
| 3 | R3 | | d3 | 0.550 | n3 | 1.522 | υ3 | 59.5 |
| 4 | R4 | | d4 | 0.400 | n4 | 1.000 | υ4 | |
| Embodiment Example 4 | | | d0 | 1.340 | | | | |
| 1 | R1 | 2.062 | d1 | 2.606 | n1 | 1.492 | υ1 | 57.4 |
| 2 | R2 | −1.182 | d2 | 0.452 | n2 | 1.000 | υ2 | |
| 3 | R3 | | d3 | 0.550 | n3 | 1.522 | υ3 | 59.5 |
| 4 | R4 | | d4 | 0.400 | n4 | 1.000 | υ4 | |
| Embodiment Example 5 | | | d0 | 0.562 | | | | |
| 1 | R1 | −25.000 | d1 | 2.695 | n1 | 1.492 | υ1 | 57.4 |
| 2 | R2 | −1.019 | d2 | 1.426 | n2 | 1.000 | υ2 | |
| 3 | R3 | | d3 | 0.550 | n3 | 1.522 | υ3 | 59.5 |
| 4 | R4 | | d4 | 0.400 | n4 | 1.000 | υ4 | |
| Embodiment Example 6 | | | d0 | 0.750 | | | | |
| 1 | R1 | −100.000 | d1 | 3.500 | n1 | 1.620 | υ1 | 60.3 |
| 2 | R2 | −1.295 | d2 | 1.374 | n2 | 1.000 | υ2 | |
| 3 | R3 | | d3 | 0.550 | n3 | 1.522 | υ3 | 59.5 |
| 4 | R4 | | d4 | 0.400 | n4 | 1.000 | υ4 | |
| Embodiment Example 7 | | | d0 | 0.952 | | | | |
| 1 | R1 | 1.910 | d1 | 2.186 | n1 | 1.492 | υ1 | 57.4 |
| 2 | R2 | −1.364 | d2 | 1.261 | n2 | 1.000 | υ2 | |

Table 1 shows a list of compositions of Embodiment Examples 1 through 7. Numbers on the left end of the table indicate numbers corresponding to the respective lens surfaces. 1 corresponds to the surface R1 on the object side of the photographing lens 1; 2 corresponds to the surface R2 on the image side; and 3 and 4, if present, correspond to surfaces of the cover glass 2. Also, R indicates a radius of curvature, d indicates a separation, n indicates a refractive index, and u indicates a dispersion.

Table 2 shows a list of aspheric coefficients of Embodiment Examples 1 through 7. Aspheric surfaces of the present invention use aspheric surfaces represented by Formula 1 for convenience sake, but are not necessarily limited to this particular type.

$$z = \frac{ch^2}{1 + \sqrt{1 - (1+k)c^2h^2}} + A_4h^4 + A_6h^6 + A_8h^8 + \ldots + A_{26}h^{26} \qquad \text{Formula 1}$$

It is noted that z in Formual 1 is a depth in the optical axis direction from a reference plane that passes an apex of an aspheric surface. c indicates a reciprocal of a surface radius of curvacure R, and h is the height of a surface from the optical axis. K is a conical constant, and $A_4$–$A_{26}$ are aspheric correction coefficients.

TABLE 2

Aspheric coefficients

| | Conical Constant | A 4 | A 6 | A 8 | A 10 |
|---|---|---|---|---|---|
| Embodiment Example 1 | | | | | |
| 1 | −0.959 | 5.77600E−03 | 5.06000E−03 | | |
| 2 | −0.824 | 1.21000E−01 | −2.77500E−02 | 1.43000E−02 | 1.30000E−03 |
| 3 | | | | | |
| 4 | | | | | |
| Embodiment Example 2 | | | | | |
| 1 | −0.960 | 7.28000E−03 | 2.51000E−03 | | |
| 2 | −0.570 | 1.11900E−01 | −2.37000E−02 | 9.55000E−03 | 2.70000E−03 |
| 3 | | | | | |
| 4 | | | | | |
| Embodiment Example 3 | | | | | |
| 1 | −9.886 | 6.24541E−02 | −1.11467E−02 | | |
| 2 | −0.655 | 1.12368E−01 | −3.64018E−02 | 2.21652E−02 | −3.81874E−03 |
| 3 | | | | | |
| 4 | | | | | |
| Embodiment Example 4 | | | | | |
| 1 | −8.405 | 4.26626E−02 | −3.32503E−03 | | |
| 2 | −0.680 | 1.14677E−01 | −4.01925E−02 | 2.04415E−02 | −2.79267E−03 |
| 3 | | | | | |
| 4 | | | | | |
| Embodiment Example 5 | | | | | |
| 1 | | −1.81208E−01 | −1.39697E−01 | −2.45397E−01 | |
| 2 | −0.982 | 1.48845E−02 | −3.06736E−02 | 1.41313E−02 | −4.79904E−03 |
| 3 | | | | | |
| 4 | | | | | |
| Embodiment Example 6 | | | | | |
| 1 | | −1.32107E−01 | 1.63508E−02 | −1.31053E−01 | |
| 2 | −0.671 | 3.05881E−02 | −3.06978E−03 | 2.82739E−04 | 3.87651E−07 |
| 3 | | | | | |
| 4 | | | | | |
| Embodiment Example 7 | | | | | |
| 1 | | | | | |
| 2 | −1.614 | 8.85213E−02 | −3.89825E−02 | 2.82994E−02 | −1.16049E−03 |

Table 3 is a list of various constants relating to each of the embodiment examples.

TABLE 3

| Embodiment Example | 1 | 2 | 3 | 4 | 5 | 6 | 7 |
|---|---|---|---|---|---|---|---|
| Fno | 2.93 | 2.94 | 2.94 | 2.95 | 2.93 | 2.91 | 2.94 |
| Angle of incidence | 32.00 | 32.00 | 32.00 | 32.00 | 32.00 | 32.00 | 32.00 |
| Angle of emission | 9.99 | 10.00 | 5.00 | 0.00 | 2.96 | 3.12 | 10.00 |
| Focal distance f | 2.06 | 2.06 | 2.07 | 2.07 | 2.07 | 2.08 | 2.07 |
| D0 | 0.91 | 1.05 | 0.98 | 1.34 | 0.56 | 0.75 | 0.95 |
| D1 | 2.38 | 2.60 | 2.60 | 2.61 | 2.70 | 3.50 | 2.19 |
| D0/f | 0.44 | 0.51 | 0.47 | 0.65 | 0.27 | 0.36 | 0.46 |
| D1/f | 1.15 | 1.26 | 1.26 | 1.26 | 1.30 | 1.69 | 1.06 |
| (D0 + D1)/f | 1.59 | 1.77 | 1.73 | 1.91 | 1.57 | 2.05 | 1.52 |
| R1/R2 | 1.37 | 1.18 | 1.76 | 1.74 | 24.53 | 77.23 | 1.40 |
| Total length T | 4.64 | 4.89 | 4.99 | 5.35 | 5.63 | 6.57 | 4.40 |
| T/f | 2.25 | 2.37 | 2.41 | 2.58 | 2.72 | 3.17 | 2.13 |

Effects of the Invention

The present invention can provide a small sized and inexpensive lens system that covers a half viewing angle of 30° or more, and has a small angle of incidence on a photographing element, in which axial aberrations and off-axis aberrations are well corrected.

The entire disclosure of Japanese Patent Application No. 2002-136253 filed May 10, 2002 is incorporated by reference.

What is claimed is:

1. A photographing lens comprising:

a positive lens having a convex surface on an image side thereof; and a diaphragm provided on an object side of the positive lens;

wherein, when a surface of the lens at least on the image side thereof is aspheric, a focal length is f, a distance from the diaphragm to a front surface of the lens is D0, and a thickness of the lens is D1:

$$0.2 < D0/f < 0.8$$

$$1.2 < (D0+D1)/f$$

$$0.4 < R2/f < 1.0.$$

2. A camera module comprising:

a sensor module disposed on the image side of the photographing lens of claim 1, wherein the sensor module has a processing function to correct a magnification chromatic aberration in each color.

3. A photographing lens comprising:

a positive lens having bi-convex surfaces; and a diaphragm provided on an object side of the positive lens;

wherein, when a surface of the lens at least on an image side thereof is aspheric, a focal length is f, a distance from the diaphragm to a front surface of the lens is D0, a thickness of the lens is D1, a radius of curvature of the lens on the object side is R1, and a radius of curvature of the lens on the image side is R2:

$$0.2 < D0/f < 0.8$$

$$1.2 < (D0+D1)/f$$

$$1.0 < R1/R2 < 2.5.$$

4. A camera module comprising:

a sensor module disposed on the image side of the photographing lens of claim 3, wherein the sensor module has a processing function to correct a magnification chromatic aberration in each color.

5. A lens comprising:

a positive lens having an aspheric convex surface on an image side thereof, a focal length f; and a thickness D1; and a diaphragm provided at a distance D0 from an object side surface of the positive lens;

wherein:

$$0.2 < D0/f < 0.8;$$

$$1.2 < (D0+D1)/f;$$

and $$0.4 < R2/f < 1.0.$$

6. The lens of claim 5 wherein the positive lens has bi-convex surfaces.

7. The lens of claim 6 wherein a radius of curvature of the positive lens on the object side is R1;

a radius of curvature of the lens on the image side is R2; and $$1.0 < R1/R2 < 2.5.$$

* * * * *